United States Patent
Lee et al.

(10) Patent No.: US 10,051,550 B2
(45) Date of Patent: Aug. 14, 2018

(54) METHOD AND APPARATUS FOR PERFORMING AUTONOMOUS DENIAL FOR DUAL CONNECTIVITY IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/502,780

(22) PCT Filed: Aug. 6, 2015

(86) PCT No.: PCT/KR2015/008230
§ 371 (c)(1),
(2) Date: Feb. 8, 2017

(87) PCT Pub. No.: WO2016/021947
PCT Pub. Date: Feb. 11, 2016

(65) Prior Publication Data
US 2017/0245199 A1    Aug. 24, 2017

Related U.S. Application Data

(60) Provisional application No. 62/034,798, filed on Aug. 8, 2014.

(51) Int. Cl.
*H04W 4/00* (2018.01)
*H04W 48/02* (2009.01)
(Continued)

(52) U.S. Cl.
CPC .......... *H04W 48/02* (2013.01); *H04W 16/32* (2013.01); *H04W 76/025* (2013.01);
(Continued)

(58) Field of Classification Search
CPC ...... H04W 48/02; H04W 16/32; H04W 88/02
(Continued)

(56) References Cited

U.S. PATENT DOCUMENTS

| 2014/0126552 | A1* | 5/2014 | Dayal | ............... | H04W 72/1215 |
| | | | | | 370/336 |
| 2015/0319643 | A1* | 11/2015 | Zhu | ................... | H04W 72/1215 |
| | | | | | 370/336 |

OTHER PUBLICATIONS

LTE, 3GPP TR 36.816 V11.2.0, Evolved Universal Terrestrial Radio Access (E-UTRA); "Study on signaling and procedure for interference avoidance for in-device coexistence" (Release 11), Dec. 2011, 46 pgs.
(Continued)

*Primary Examiner* — Nghi H Ly
(74) *Attorney, Agent, or Firm* — Lee Hong Degerman Kang Waimey

(57) ABSTRACT

A method and apparatus for performing autonomous denial for dual connectivity in a wireless communication system is provided. A user equipment (UE) receives an autonomous denial rate from a network, and applies the received autonomous denial rate to at least one of a master cell group (MCG) or a secondary cell group (SCG). The UE is connected to both a master evolved NodeB (MeNB), associated with the MCG, and a secondary eNB (SeNB), associated with the SCG, in dual connectivity.

5 Claims, 13 Drawing Sheets

(51) Int. Cl.
  *H04W 16/32* (2009.01)
  *H04W 76/02* (2009.01)
  *H04W 76/15* (2018.01)
  *H04W 88/02* (2009.01)
  *H04W 88/08* (2009.01)
(52) U.S. Cl.
  CPC ............ *H04W 76/15* (2018.02); *H04W 88/02* (2013.01); *H04W 88/08* (2013.01)
(58) Field of Classification Search
  USPC .......... 455/422.1, 418, 432.1, 421, 436, 442
  See application file for complete search history.

(56) References Cited

OTHER PUBLICATIONS

LTE, 3GPP TR 36.842 V12.0.0, 3rd Generation Partnership Project; Technical Specification Group Radio Access Network; "Study on Small Cell enhancements for E-UTRA and E-UTRAN; Higher layer aspects (Release 12)," Dec. 2013, 71 pgs.
CMCC, "Consideration on Autonomous denials," R2-122322, 3GPP TSG-RAN WG2 #78, May 21-25, 2012, 4 pgs.
Broadcom Corporation, III, ITRI, "IDC issues on WLAN measurements for WLAN/3GPP Radio Interworking," R2-133995, 3GPP TSG-RAN WG2 Meeting #84, Nov. 11-15, 2013, San Francisco, CA, US, 6 pgs.
Intel Corporation, "Dual connectivity and in-device coexistence," R2-142043, 3GPP TSG RAN WG2 Meeting #86, Seoul, South Korea, May 19-23, 2014, 3 pgs.
LTE, 3GPP TS 36.300 V12.2.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Section 23.4, Jun. 2014, 5 pgs.
PCT International Application No. PCT/KR2015/008230, International Search Report dated Nov. 24, 2015, 2 pages.

* cited by examiner

METHOD AND APPARATUS FOR PERFORMING AUTONOMOUS DENIAL FOR DUAL CONNECTIVITY IN WIRELESS COMMUNICATION SYSTEM

CROSS-REFERENCE TO RELATED APPLICATIONS

This application is the National Stage filing under 35 U.S.C. 371 of International Application No. PCT/KR2015/008230, filed on Aug. 6, 2015, which claims the benefit of U.S. Provisional Application No. 62/034,798, filed on Aug. 8, 2014, the contents of which are all hereby incorporated by reference herein in their entirety.

BACKGROUND OF THE INVENTION

Field of the Invention

The present invention relates to wireless communications, and more particularly, to a method and apparatus for performing autonomous denial for dual connectivity in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a user equipment (UE) consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

In order to allow users to access various networks and services ubiquitously, an increasing number of UEs are equipped with multiple radio transceivers. For example, a UE may be equipped with LTE, Wi-Fi, Bluetooth transceivers, and global navigation satellite system (GNSS) receivers. For example, a UE may be equipped with a LTE module and a Bluetooth module in order to receive a voice over Internet (VoIP) services and multimedia services using a Bluetooth earphone. Or, a UE may be equipped with a LTE module and a Wi-Fi module in order to distribute traffics. Or, a UE may be equipped with a LTE module and a GNSS module in order to acquire location information additionally.

Due to extreme proximity of multiple radio transceivers within the same UE operating on adjacent frequencies or sub-harmonic frequencies, the interference power coming from a transmitter of the collocated radio may be much higher than the actual received power level of the desired signal for a receiver. This situation causes in-device coexistence (IDC) interference and is referred to as IDC problems. The challenge lies in avoiding or minimizing IDC interference between those collocated radio transceivers, as current state-of-the-art filter technology might not provide sufficient rejection for certain scenarios.

In order to avoid IDC interference, autonomous denial may be used. Accordingly, a method for performing autonomous denial for dual connectivity may be required.

SUMMARY OF THE INVENTION

The present invention provides a method and apparatus for performing autonomous denial for dual connectivity in a wireless communication system. The present invention provides a method and apparatus for applying received autonomous denial rate to at least one of a master cell group (MCG) or a secondary cell group (SCG).

In an aspect, a method for performing, by a user equipment (UE), autonomous denial for dual connectivity in a wireless communication system is provided. The method includes receiving an autonomous denial rate from a network, and applying the received autonomous denial rate to at least one of a master cell group (MCG) or a secondary cell group (SCG). The UE is connected to both a master evolved NodeB (MeNB), associated with the MCG, and a secondary eNB (SeNB), associated with the SCG, in dual connectivity.

In another aspect, a user equipment (UE) includes a memory, a transceiver, and a processor coupled to the memory and the transceiver, and configured to control the transceiver to receive an autonomous denial rate from a network, and apply the received autonomous denial rate to at least one of a master cell group (MCG) or a secondary cell group (SCG). The UE is connected to both a master evolved NodeB (MeNB), associated with the MCG, and a secondary eNB (SeNB), associated with the SCG, in dual connectivity.

Autonomous denial can be performed efficiently for dual connectivity.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
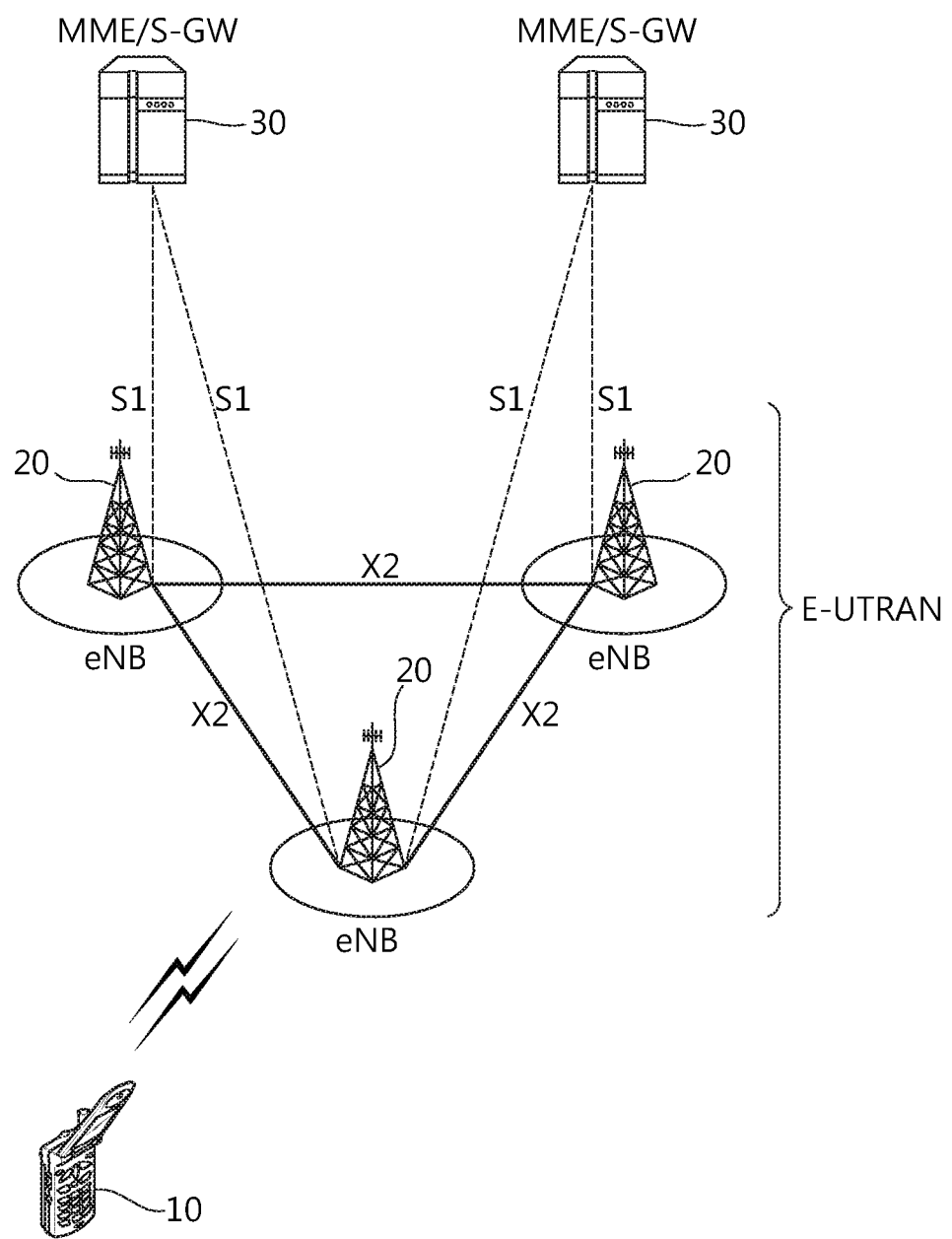
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
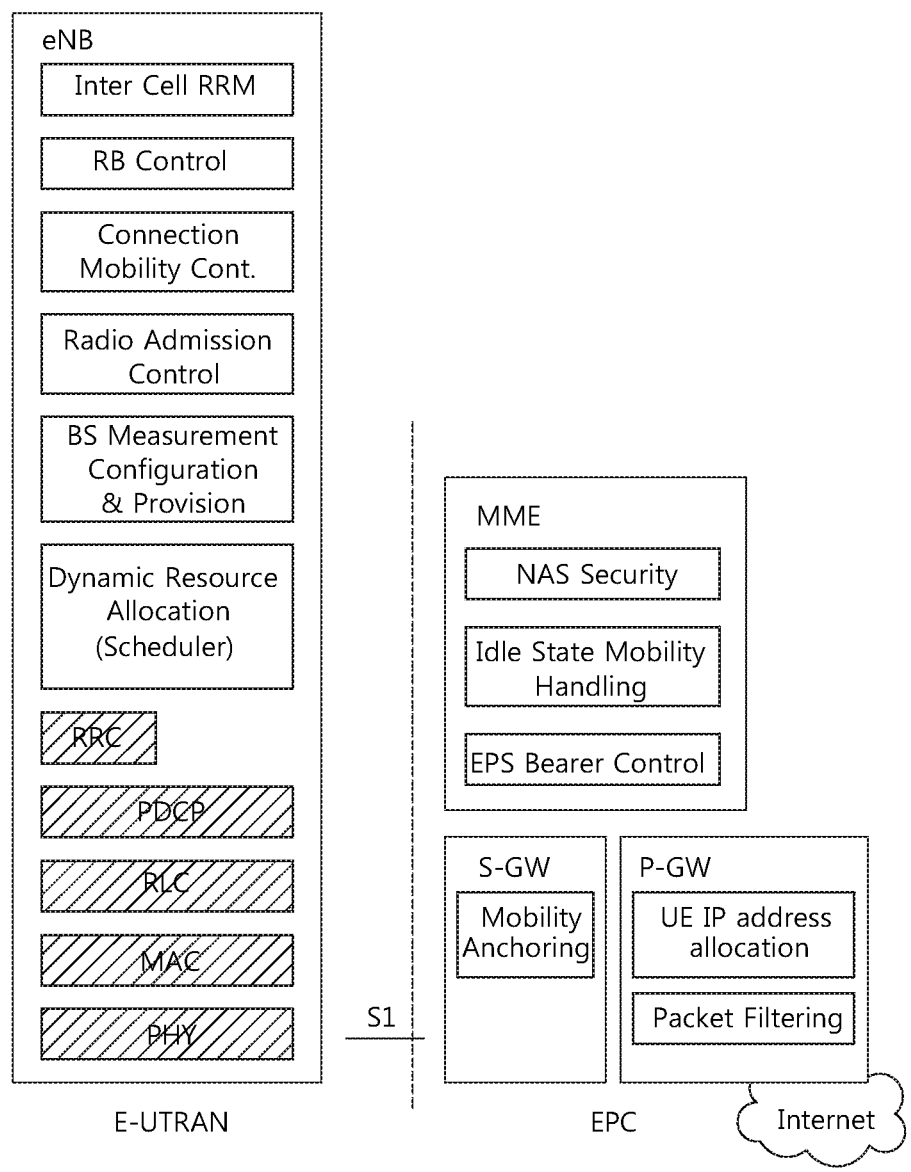
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
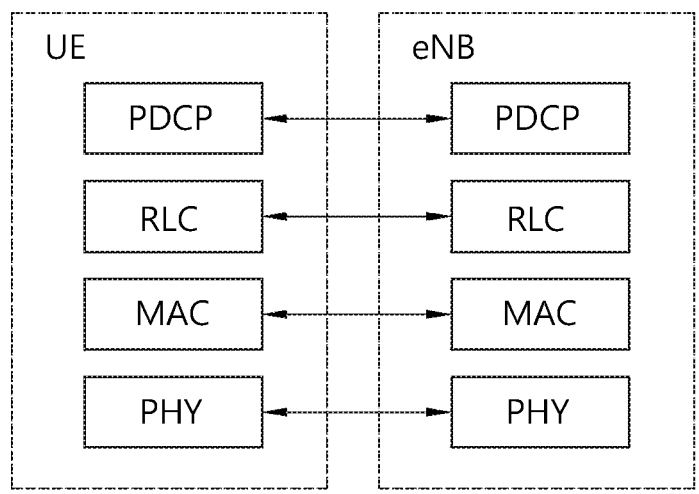
FIG. 3 shows a block diagram of a user plane protocol stack of an LTE system.
Figure 4:
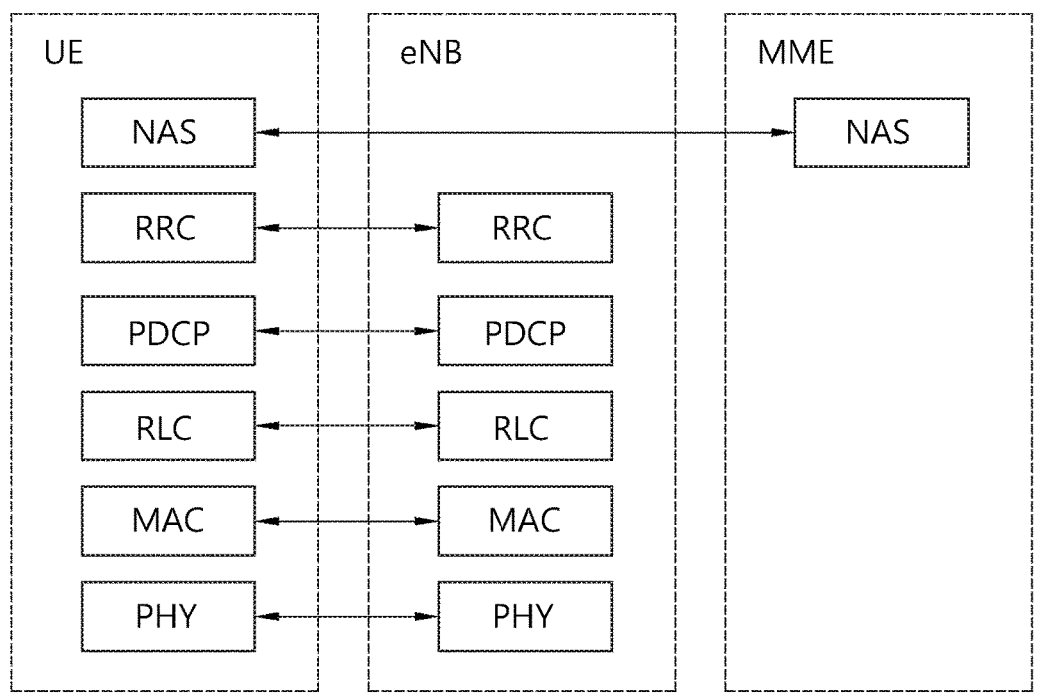
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
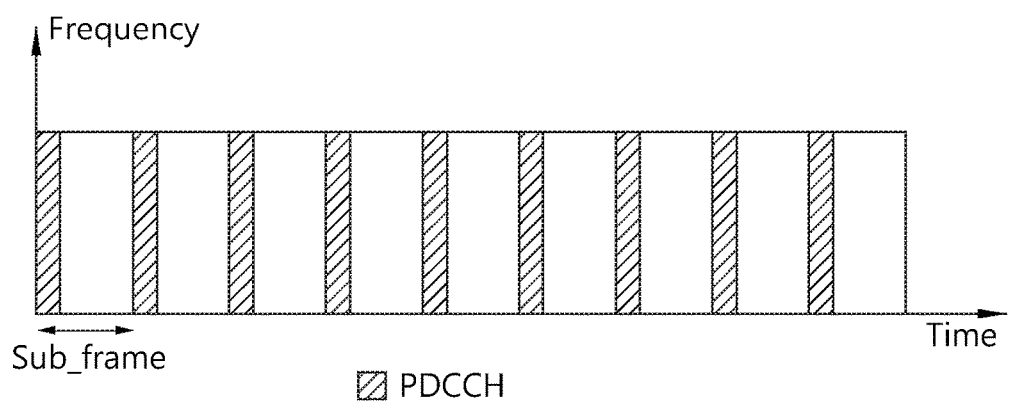
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Hereinafter, in-device coexistence (IDC) is described below. It may be referred to Section 23.4 of 3GPP TS 36.300 V12.2.0 (2014-06).

Figure 6:
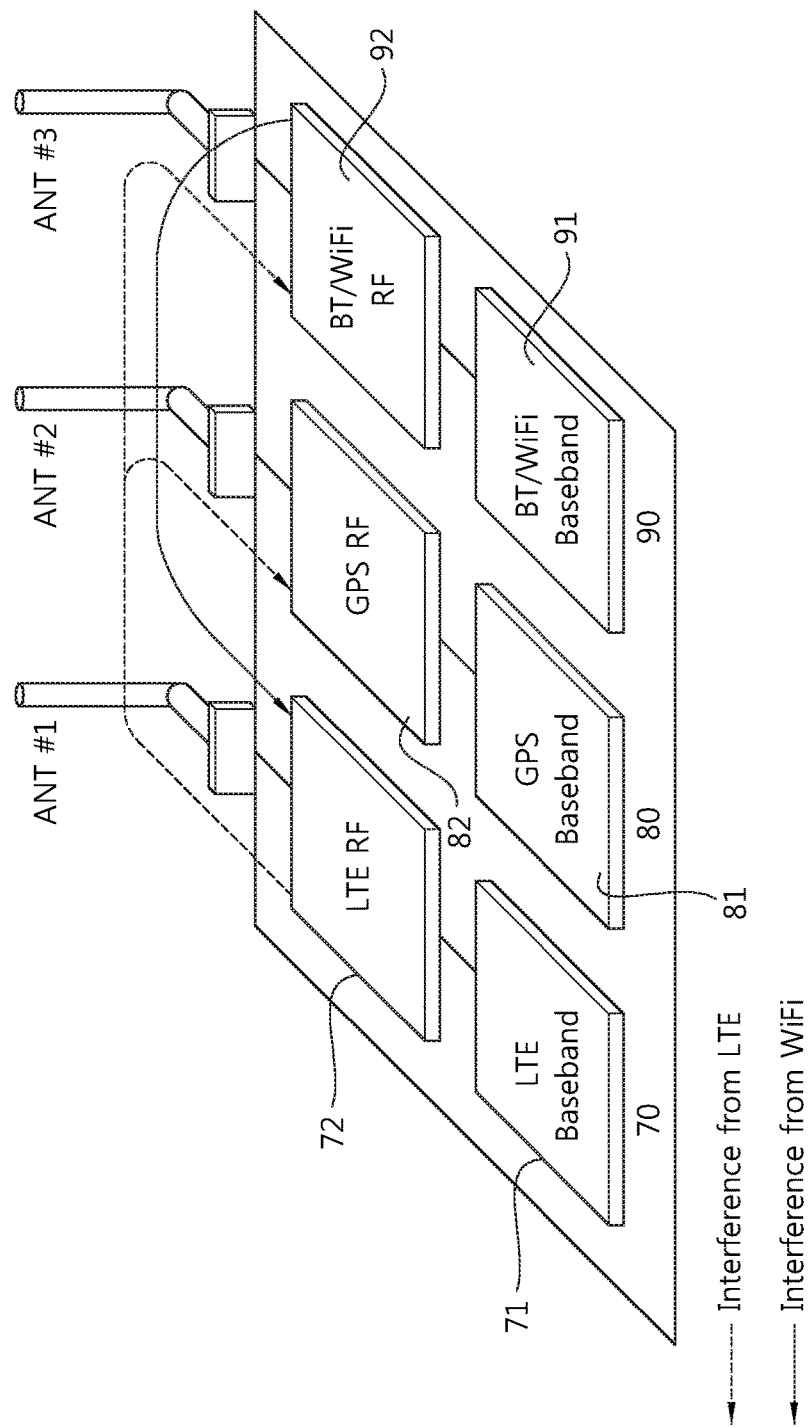
FIG. 6 shows an example of IDC interference within a UE.

FIG. 6 shows an example of IDC interference within a UE. A LTE module 70 includes a LTE baseband 71 and a LTE radio frequency (RF) 72. A global positioning system (GPS) module 80 includes a GPS baseband 81 and a GPS RF 82. A Bluetooth (BT)/Wi-Fi module 90 includes a BT/Wi-Fi baseband 91 and a BT/Wi-Fi RF 92. For example, if all of the LTE module 70, the GPS module 80 and the BT/Wi-Fi module 90 are switched on, the LTE module 70 may interfere the GPS module 80 and the BT/Wi-Fi module 90. Or the BT/Wi-Fi module 90 may interfere the LTE module 70.

When a UE experiences IDC problems that it cannot solve by itself and a network intervention is required, it sends an IDC indication via dedicated RRC signaling to report the IDC problems to the eNB. A UE that supports IDC functionality indicates this capability to the network, and the network can then configure by dedicated signaling whether the UE is allowed to send an IDC indication. The IDC indication can only be triggered for frequencies for which a measurement object is configured and when:
  for the primary frequency, the UE is experiencing IDC problems that it cannot solve by itself;
  for a secondary frequency, regardless of the activation state of the corresponding secondary cell (SCell), the UE is experiencing or expects to experience upon activation IDC problems that it cannot solve by itself;
  for a non-serving frequency, the UE expects to experience IDC problems that it cannot solve by itself if that non-serving frequency becomes a serving one.

When notified of IDC problems through an IDC indication from the UE, the eNB can choose to apply a frequency division multiplexing (FDM) solution or a time division multiplexing (TDM) solution. The basic concept of an FDM solution is to move the LTE signal away from the industrial, scientific and medical (ISM) band by e.g., performing inter-frequency handover within E-UTRAN or removing SCells from the set of serving cells. The basic concept of a TDM solution is to ensure that transmission of a radio signal does not coincide with reception of another radio signal. LTE discontinuous reception (DRX) mechanism is used to provide TDM patterns (i.e. periods during which the LTE UE may be scheduled or is not scheduled) to resolve the IDC issues. DRX based TDM solution should be used in a predictable way, i.e. the eNB should ensure a predictable pattern of unscheduled periods by means of DRX mechanism.

Figure 7:
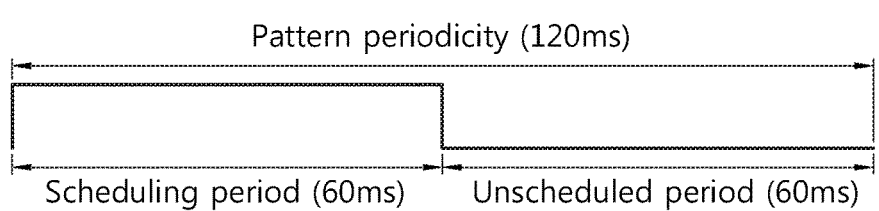
FIG. 7 shows an example of a TDM pattern according to a TDM solution.

FIG. 7 shows an example of a TDM pattern according to a TDM solution. Referring to FIG. 7, a periodicity of a TDM pattern is 120 ms. A LTE module performs transmission or reception using only a scheduling period having a length of 60 ms. Another coexisting module performs transmission or reception using only an unscheduled period having a length of 60 ms.

To assist the eNB in selecting an appropriate solution, all necessary/available assistance information for both FDM and TDM solutions is sent together in the IDC indication to the eNB. The IDC assistance information contains the list of E-UTRA carriers suffering from IDC problems, the direction of the interference and, depending on the scenario, it also contains TDM patterns or parameters to enable appropriate DRX configuration for TDM solutions on the serving E-UTRA carrier. The IDC indication is also used to update the IDC assistance information, including for the cases when the UE no longer suffers from IDC problems. In case of inter-eNB handover, the IDC assistance information is transferred from the source eNB to the target eNB.

In addition, once configured by the network, the UE can autonomously deny LTE UL transmission in all phases to protect ISM in rare cases if other solutions cannot be used. Conversely, it is assumed that the UE also autonomously denies ISM transmission in order to ensure connectivity with the eNB to perform necessary LTE procedures, e.g., RRC connection reconfiguration and paging reception, etc. The network may configure a long-term denial rate by dedicated RRC signaling to limit the amount of LTE UL autonomous denials. Otherwise, the UE shall not perform any LTE UL autonomous denials. The UE may check whether to use or not autonomous denial using a moving window. The UE may check whether the number of performed autonomous denials is lower than an autonomous denial rate, configured by the eNB, during the moving window, including the current subframe, in the past, and if lower, the UE may additionally perform autonomous denial in the current subframe. The autonomous denial rate may be defined by the value of autonomousDenialSubframes divided by autonomousDenialValidity, which are configured by UE-dedicates signaling, from the eNB to the UE, as described in Table 1 below.

Parameters for the autonomous denial may be configured in OtherConfig information element (IE). The OtherConfig IE contains configuration related to other configuration. Table 1 shows an example of the OtherConfig IE.

TABLE 1

```
-- ASN1START
OtherConfig-r9 ::=   SEQUENCE {
    reportProximityConfig-r9        ReportProximityConfig-r9
    OPTIONAL, -- Need ON
    ...,
    [[ idc-Config-r11                IDC-Config-r11
    OPTIONAL, -- Need ON
        powerPrefIndicationConfig-r11   PowerPrefIndicationConfig-r11
    OPTIONAL, -- Need ON
        obtainLocationConfig-r11        ObtainLocationConfig-r11
    OPTIONAL   -- Need ON
    ]]
```

TABLE 1-continued

```
}
IDC-Config-r11 ::= SEQUENCE {
      idc-Indication-r11                    ENUMERATED {setup}
OPTIONAL,  -- Need OR
      autonomousDenialParameters-r11        SEQUENCE {
            autonomousDenialSubframes-r11        ENUMERATED {n2, n5, n10,
n15,
                                                       n20, n30, spare2,
spare1},
            autonomousDenialValidity-r11         ENUMERATED {
                                                       sf200, sf500, sf1000,
sf2000,
                                                       spare4, spare3, spare2,
spare1}
      }
OPTIONAL,  -- Need OR
      ...
}
ObtainLocationConfig-r11 ::= SEQUENCE {
      obtainLocation-r11                    ENUMERATED {setup}
OPTIONAL -- Need OR
}
PowerPrefIndicationConfig-r11 ::= CHOICE{
      Release                               NULL,
      Setup                                 SEQUENCE{
            powerPrefIndicationTimer-r11         ENUMERATED {s0, s0dot5, s1, s2, s5,
s10, s20,
                                                       s30, s60, s90, s120, s300,
s600, spare3,
                                                       spare2, spare 1}
      }
}
ReportProximityConfig-r9 ::= SEQUENCE {
      proximityIndicationEUTRA-r9           ENUMERATED {enabled}
OPTIONAL,  -- Need OR
      proximityIndicationUTRA-r9            ENUMERATED {enabled}
OPTIONAL    -- Need OR
}
-- ASN1STOP
```

Referring to Table 1, the OtherConfig IE includes parameters for the autonomous denial, i.e., autonomousDenialParameters field. The autonomousDenialParameters field includes autonomousDenialSubframes field and autonomousDenialValidity field. The autonomousDenialSubframes field indicates the maximum number of the UL subframes for which the UE is allowed to deny any UL transmission. Value n2 corresponds to 2 subframes, n5 to 5 subframes and so on. The autonomousDenialValidity field indicates the validity period over which the UL autonomous denial subframes shall be counted. Value sf200 corresponds to 200 subframes, sf500 corresponds to 500 subframes and so on.

Overall architecture and network interface for dual connectivity (DC) is described. It may be referred to 3GPP TR 36.842 V12.0.0 (2013-12). The E-UTRAN supports dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 8:
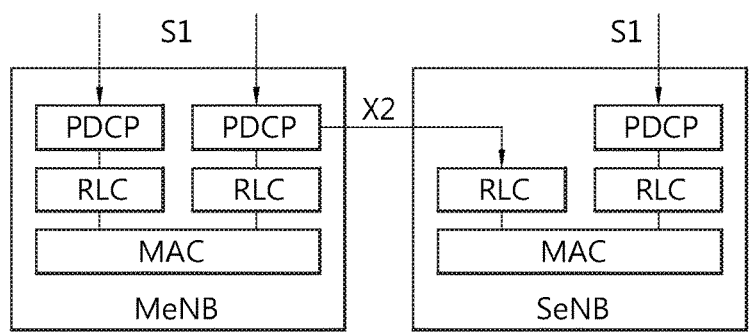
FIG. 8 shows radio protocol architecture for dual connectivity.

FIG. 8 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 8, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB.

In DC, the configured set of serving cells for a UE consists of two subsets: the MCG containing the serving cells of the MeNB, and the SCG containing the serving cells of the SeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

For SCG, the following principles are applied:
  At least one cell in SCG has a configured UL and one of them is configured with physical uplink control channel (PUCCH) resources;
  Upon detection of a physical layer problem or a random access problem on PSCell, or the maximum number of RLC retransmissions has been reached associated with the SCG, RRC connection re-establishment procedure is not triggered/All UL transmissions towards all cells of the SCG are stopped/The UE is not required to monitor PDCCH on any cell of the SCG;

MeNB is informed by the UE of SCG failure type.

For split bearer, the data transfer over the MeNB is maintained.

Only the RLC acknowledged mode (AM) bearer can be configured for the split bearer;

Like PCell, PSCell cannot be de-activated.

With respect to the interaction between MeNB and SeNB, the following principles are applied:

The MeNB maintains the radio resource management (RRM) measurement configuration of the UE and may, e.g., based on received measurement reports or traffic conditions or bearer types, decide to ask an SeNB to provide additional resources (serving cells) for a UE.

Upon receiving the request from the MeNB, a SeNB may create the container that will result in the configuration of additional serving cells for the UE (or decide that it has no resource available to do so).

For UE capability coordination, the MeNB provides (part of) the AS-configuration and the UE capabilities to the SeNB.

The MeNB and the SeNB exchange information about UE configuration by means of RRC containers (inter-node messages) carried in X2 messages.

The SeNB may initiate a reconfiguration of its existing serving cells (e.g., PUCCH towards the SeNB).

The SeNB decides PSCell within the SCG.

The MeNB does not change the content of the RRC configuration provided by the SeNB.

In the case of the SCG addition and SCG SCell addition, the MeNB may provide the latest measurement results for the SCG cell(s).

When adding a new SCG SCell, dedicated RRC signalling is used for sending all required system information of the cell as for CA, except for the SFN acquired from MIB of the PSCell of SCG. For split bearer, UE is configured over which link the UE transmits UL PDCP PDU.

Figure 9:
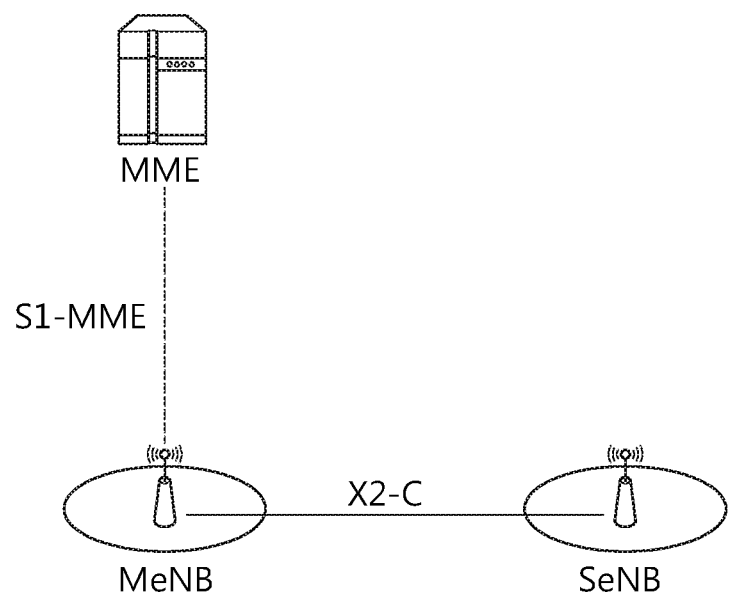
FIG. 9 shows C-plane connectivity of eNBs involved in dual connectivity for a certain UE.

FIG. 9 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 9, the MeNB is C-plane connected to the MME via S1-MME, the MeNB and the SeNB are interconnected via X2-C.

Figure 10:
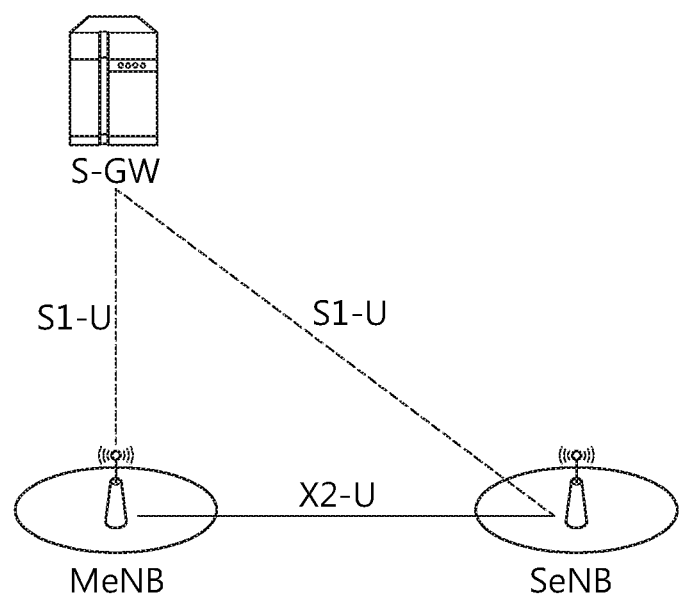
FIG. 10 shows U-plane connectivity of eNBs involved in dual connectivity for a certain UE.

FIG. 10 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

When the UE is configured to support dual connectivity, i.e. the UE is connected with both MCG and SCG, the multiple serving cells of MCG/SCG may cause the IDC interference to the coexisting radio modules within the UE. Currently, it is not defined how to perform autonomous denial for dual connectivity.

Hereinafter, a method for performing autonomous denial for dual connectivity according to an embodiment of the present invention is described. According to an embodiment of the present invention, a method for applying autonomous denial for multiple serving cells of MCG/SCG causing the IDC interference to the coexisting radio modules, which operate in adjacent frequencies, within the UE may be proposed. According to a cell group to which autonomous denial is applied, the number of configured autonomous denial rates, and whether the autonomous denial rate is configured per UE and/or per cell group, the embodiments of the present invention may be classified as follows.

(1) The UE may apply the configured autonomous denial rate only to the MCG. The network may configure one autonomous denial rate to the UE. Upon receiving the configured autonomous denial rate, the UE may perform autonomous denial by applying the configured autonomous denial rate to serving cells belonging to the MCG. The UE may consider that one denial occurs when denial occurs at one or more serving cell, among serving cells belonging to the MCG, in each subframe. When the number of denials is lower than the configured autonomous denial rate within the moving window, the UE may perform autonomous denial in the current subframe.

(2) The UE may apply the configured autonomous denial rate only to cell groups (e.g. MCG, SCG) indicated by the network or all serving cells belonging to all cell groups (i.e. MCG and SCGs). The network may configure an autonomous denial rate and a cell group to which the corresponding autonomous denial rate is to be applied to the UE. Upon receiving the configured autonomous denial rate and the configured cell group to which the corresponding autonomous denial rate is to be applied, the UE may perform autonomous denial by applying the configured autonomous denial rate to serving cells in the configured cell group.

The configured autonomous denial rate may be provided per cell group. That is, the network may configure an autonomous denial rate per cell group and a cell group to which the corresponding autonomous denial rate is to be applied to the UE. Or, the network may configure a common autonomous denial rate which can be applied to all cell groups to the UE. The UE may calculate and check the number of performed autonomous denials per cell group. The UE may perform autonomous denial by the configured autonomous denial rate to serving cells belonging to each cell group. In this case, the UE may need to manage moving windows as many as the number of serving cells. Or, the UE may manage one moving window per cell group, and when denial occurs at one or more serving cell, among serving cells belonging to each cell group, in each subframe, the UE may consider that one denial occurs.

Alternatively, the configured autonomous denial rate may be provided per UE. That is, the network may configure an autonomous denial rate per UE to the UE. The UE may calculate the number of performed autonomous denials for all cell groups. The UE may calculate the number of performed autonomous denials by using one moving window, and when the number of performed autonomous denials for all serving cells in all cell groups is lower than the configured autonomous denial rate within the moving window, the UE may perform autonomous denial in the current subframe. Or, when the sum of the number of performed autonomous denials for each cell group is lower than the configured autonomous denial rate within the moving window, the UE may perform autonomous denial in the current subframe. In this case, the UE may consider that one denial occurs when denial occurs at one or more serving cell, among serving cells belonging to each cell group, in each subframe.

Alternatively, the configured autonomous denial rate may be provided both per cell group and per UE. That is, the network may configure both an autonomous denial rate per cell group and an autonomous denial rate per UE to the UE. The UE may calculate the number of performed autonomous denials per cell group, and simultaneously, calculate the number of performed autonomous denials per UE. The UE may perform autonomous denial in the current subframe only when the following two conditions are satisfied.

- The number of denied subframes for each cell group over a duration of validity period from this subframe in the past does not exceed the configured autonomous denial rate for each cell group.
- The total number of denied subframes for all the cell (or cell groups) over a duration of validity period from this subframe in the past does not exceed the configured autonomous denial rate for the UE.

Figure 11:
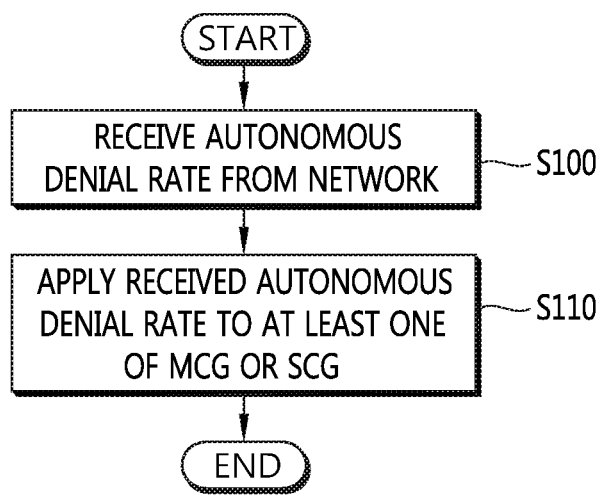
FIG. 11 shows an example of a method for performing autonomous denial for dual connectivity according to an embodiment of the present invention.

FIG. 11 shows an example of a method for performing autonomous denial for dual connectivity according to an embodiment of the present invention.

In step S100, the UE receives an autonomous denial rate from a network. In step S110, the UE applies the received autonomous denial rate to at least one of a MCG or SCG. The UE is connected to both a MeNB, associated with the MCG, and a SeNB, associated with the SCG, in dual connectivity.

The received autonomous denial rate may be applied only to the MCG. In this case, the UE may calculate a number of performed autonomous denial for serving cells belonging to the MCG within a moving window including a current subframe, and perform autonomous denial in the current subframe when the number of performed autonomous denial within the moving window is lower than the received autonomous denial rate.

Alternatively, the received autonomous denial rate may be applied only to a cell group, among the MCG and the SCG, indicated by the network. That is, the received autonomous denial rate may be configured per cell group. In this case, the UE may further receive information on the cell group to which the autonomous denial rate is to be applied from the network. The UE calculate a number of performed autonomous denial for serving cells belonging to the cell group within a moving window including a current subframe, and perform autonomous denial in the current subframe when the number of performed autonomous denial within the moving window is lower than the received autonomous denial rate for the cell group.

Alternatively, the received autonomous denial rate may be applied to all serving cells belonging to all cell groups. That is, the received autonomous denial rate may be configured per UE. In this case, the UE may calculate a number of performed autonomous denial for all serving cells belonging to all cell groups within a moving window including a current subframe, and perform autonomous denial in the current subframe when the number of performed autonomous denial within the moving window is lower than the received autonomous denial rate for the UE. Or, the UE may calculate a number of performed autonomous denial for serving cells belonging to each cell group within a moving window including a current subframe, and perform autonomous denial in the current subframe when the number of performed autonomous denial within the moving window is lower than the received autonomous denial rate for the UE.

Alternatively, the received autonomous denial rate may be configured both per cell group and per UE.

Figure 12:
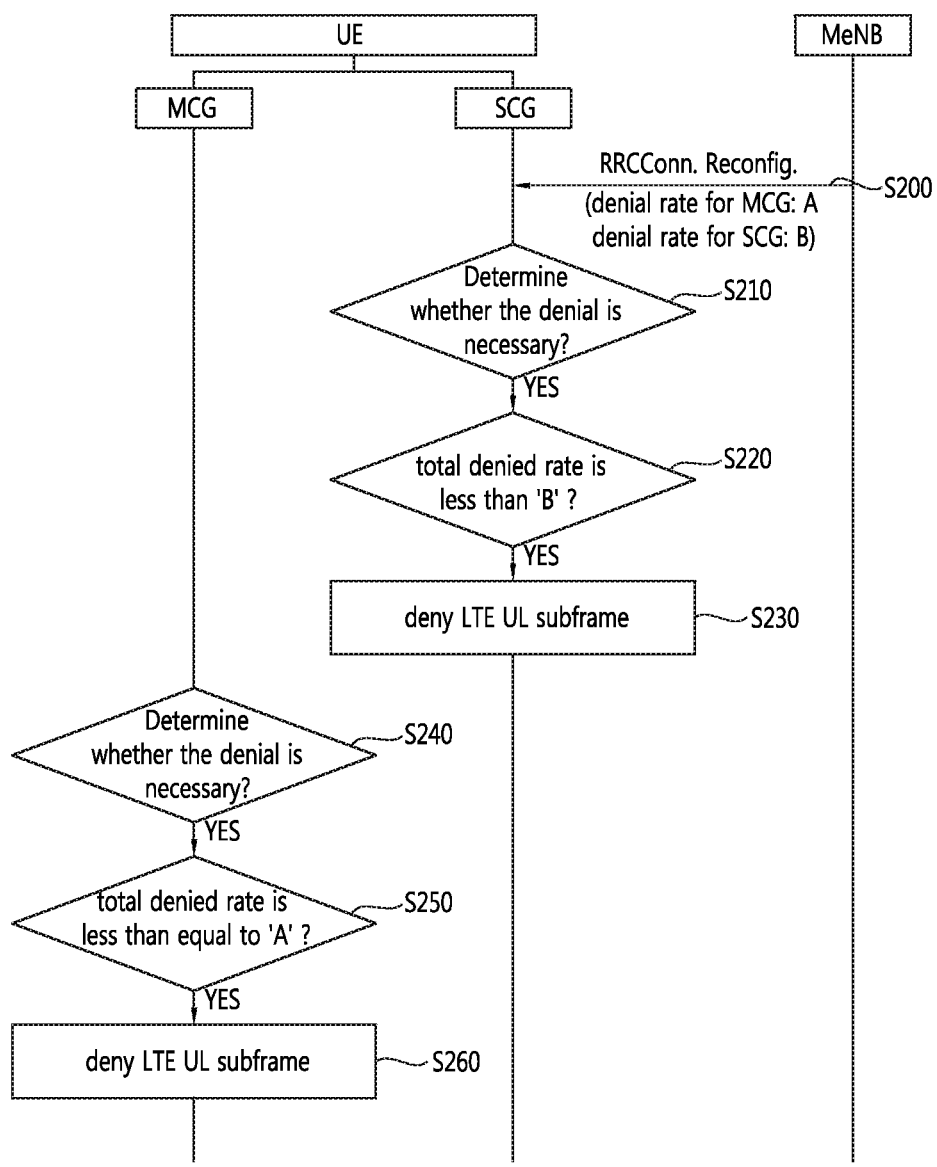
FIG. 12 shows another example of a method for performing autonomous denial for dual connectivity according to an embodiment of the present invention.

FIG. 12 shows another example of a method for performing autonomous denial for dual connectivity according to an embodiment of the present invention. This embodiment shows an example of per cell group based autonomous denial according to an embodiment of the present invention.

In step S200, the MeNB transmits the RRC connection reconfiguration message which includes an autonomous denial rate for MCG ('A') and an autonomous denial rate for SCG ('B').

In step S210, the UE determines whether to perform autonomous denial for SCG. If necessary, in step S220, the UE calculates the total performed autonomous denials for SCG, and determines whether the total performed autonomous denials for SCG is less than the autonomous denial rate for SCG ('B'). If so, in step S230, the UE perform autonomous denial for SCG.

In step S240, the UE determines whether to perform autonomous denial for MCG. If necessary, in step S250, the UE calculates the total performed autonomous denials for MCG, and determines whether the total performed autonomous denials for MCG is less than the autonomous denial rate for MCG ('A'). If so, in step S260, the UE perform autonomous denial for MCG.

Figure 13:
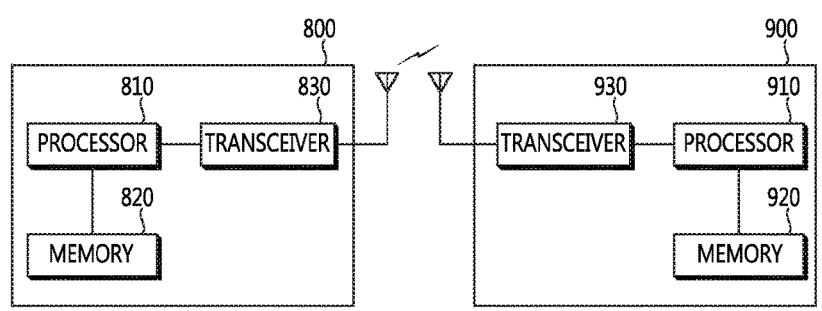
FIG. 13 shows a wireless communication system to implement an embodiment of the present invention.

FIG. 13 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a user equipment (UE), autonomous denial for dual connectivity in a wireless communication system, the method comprising:
    receiving an autonomous denial rate from a network;
    applying the received autonomous denial rate to a cell group among a master cell group (MCG) and a secondary cell group (SCG);
    calculating a number of performed autonomous denials for serving cells belonging to the cell group within a moving window including a current subframe; and
    performing an autonomous denial in the current subframe when the number of performed autonomous denials within the moving window is lower than the received autonomous denial rate for the cell group,
    wherein the UE is connected to both a master evolved NodeB (MeNB), associated with the MCG, and a secondary eNB (SeNB), associated with the SCG, in dual connectivity.

2. The method of claim 1, wherein the received autonomous denial rate is configured per cell group.

3. The method of claim 1, further comprising receiving information on the cell group to which the autonomous denial rate is to be applied from the network.

4. The method of claim 1, wherein the received autonomous denial rate is configured both per cell group and per UE.

5. A user equipment (UE) comprising:
    a memory;
    a transceiver; and
    a processor coupled to the memory and the transceiver, and configured to:
        control the transceiver to receive an autonomous denial rate from a network;
        apply the received autonomous denial rate to a cell group among a master cell group (MCG) and a secondary cell group (SCG);
        calculate a number of performed autonomous denials for serving cells belonging to the cell group within a moving window including a current subframe;
        perform an autonomous denial in the current subframe when the number of performed autonomous denials within the moving window is lower than the received autonomous denial rate for the cell group,
    wherein the UE is connected to both a master evolved NodeB (MeNB), associated with the MCG, and a secondary eNB (SeNB), associated with the SCG, in dual connectivity.

* * * * *